(12) United States Patent
Morgan et al.

(10) Patent No.: US 12,183,325 B2
(45) Date of Patent: Dec. 31, 2024

(54) SEARCHING CALLS BASED ON CONTEXTUAL SIMILARITY AMONG CALLS

(71) Applicant: Calabrio, Inc., Minneapolis, MN (US)

(72) Inventors: Dylan Morgan, Minneapolis, MN (US); Boris Chaplin, Medina, MN (US); Kyle Smaagard, Forest Lake, MN (US); Chris Vanciu, Isle, MN (US); Paul Gordon, Minneapolis, MN (US); Matt Matsui, Minneapolis, MN (US); Laura Cattaneo, Rochester, MN (US); Catherine Bullock, Minneapolis, MN (US)

(73) Assignee: Calabrio, Inc., Minneapolis, MN (US)

( * ) Notice: Subject to any disclaimer, the term of this patent is extended or adjusted under 35 U.S.C. 154(b) by 243 days.

(21) Appl. No.: 17/549,612

(22) Filed: Dec. 13, 2021

(65) Prior Publication Data
US 2023/0186897 A1 Jun. 15, 2023

(51) Int. Cl.
| | |
|---|---|
| *G10L 15/06* | (2013.01) |
| *G10L 15/18* | (2013.01) |
| *G10L 17/06* | (2013.01) |
| *H04M 3/22* | (2006.01) |
| *H04M 3/42* | (2006.01) |

(52) U.S. Cl.
CPC .......... *G10L 15/06* (2013.01); *G10L 15/1815* (2013.01); *G10L 17/06* (2013.01); *H04M 3/2218* (2013.01); *H04M 3/42221* (2013.01)

(58) Field of Classification Search
None
See application file for complete search history.

(56) References Cited

U.S. PATENT DOCUMENTS

| | | | |
|---|---|---|---|
| 10,671,672 B1* | 6/2020 | Eksombatchai | ........ G06F 18/23 |
| 2018/0027123 A1* | 1/2018 | Cartwright | ........ H04M 3/42221 |
| | | | 379/202.01 |

* cited by examiner

*Primary Examiner* — Quynh H Nguyen (57) ABSTRACT

Systems and methods are provided for determining calls and contacts associated with calls that are contextually similar based on content of the calls. Data associated with a call include one or more utterances made by speakers and a set of values indicating relevance between content of the call and topic categories of the call. The disclosed technology generates a topic vector associated with a call and/or respective speakers of the call. The topic vector includes a multi-dimensional vector where each dimension corresponds to a topic category. The disclosed technology determines calls that are contextually similar by comparing angular distances between topic vectors. A search query receiver receives a search query that queries contacts and calls that are contextually similar to a given call and/or a speaker. The disclosed technology identifies calls with topic vectors that are within a predetermined angular distance.

20 Claims, 7 Drawing Sheets

| Contact Identifier 302 | Speaker Identifier 304 | Topic Categories 306 (%) | | | | Contact Duration 308 (seconds) |
|---|---|---|---|---|---|---|
| | | Billing | Website | Products | Repair | |
| 1 | 1201 | 60 | 0 | 40 | 0 | 182 |
| 2 | 1202 | 0 | 100 | 0 | 0 | 676 |
| 3 | 1203 | 100 | 0 | 0 | 0 | 86 |
| 4 | 1255 | 98 | 0 | 2 | 0 | 3541 |
| 5 | 1255 | 40 | 95 | 0 | 60 | 2491 |
| 6 | 1240 | 0 | 0 | 5 | 0 | 152 |
| 7 | 1240 | 20 | 98 | 80 | 0 | 396 |
| 8 | 1233 | 0 | 0 | 2 | 0 | 709 |
| 9 | 1225 | 100 | 0 | 0 | 0 | 946 |
| 10 | 1265 | 0 | 0 | 50 | 50 | 851 |
| 11 | 1202 | 100 | 0 | 0 | 0 | 846 |

| Contact Identifier 402A | Speaker Identifier 404A | Topic Categories 406A (%) | | | |
|---|---|---|---|---|---|
| | | Billing | Website | Products | Repair |
| 95 | 1202 | 99 | 1 | 0 | 0 |
| 3 | 1203 | 100 | 0 | 0 | 0 |
| 4 | 1255 | 98 | 0 | 2 | 0 |
| 9 | 1225 | 100 | 0 | 0 | 0 |
| 11 | 1202 | 100 | 0 | 0 | 0 |

| Contact Identifier 402B | Speaker Identifier 404B | Topic Categories 406B (%) | | | |
|---|---|---|---|---|---|
| | | Billing | Website | Products | Repair |
| 1 | 1 (Agent) | 20 | 0 | 35 | 0 |
| 1 | 2 (Caller – Client) | 40 | 0 | 5 | 0 |
| 4 | 1 (Agent) | 35 | 0 | 1 | 0 |
| 4 | 2 (Caller – Client) | 63 | 0 | 1 | 0 |
| 10 | 1 (Agent) | 0 | 0 | 35 | 10 |
| 10 | 2 (Caller - Client) | 0 | 0 | 5 | 40 |

SEARCHING CALLS BASED ON CONTEXTUAL SIMILARITY AMONG CALLS

Reviewing contexts of conversations are important in maintaining and improving the quality of the conversations. In particular, professional call centers regularly review contacts (i.e., calls) taken by its agents (e.g., call operators). Based on the reviews, the call center trains the agents to improve quality of the contacts by implementing various guidance including focusing on particular topics and shortening the contact durations, for example. The review process often includes searching for and retrieving contacts that are similar to the contacts in question and comparing the contacts. For example, an agent searches for similar contacts in real-time while the contact in question is ongoing. The agent had handled one particular call poorly and the agent (or a trainer of the agent) wants to see or hear similar conversations that were handled differently (e.g., better).

Issues arise in searching for similar calls. A search in traditional system uses metadata of call records and identifies contacts that match with a given search query. The metadata includes a date and time of the contact, a speaker identity, speaker information, a duration of the contact, and/or a duration of time on hold. There has been a need to search call data based on content of contacts. As such, developing a technology that searches for contacts based on similarity in content of the contacts in a holistic manner is needed.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

Aspects of the present disclosure relate to searching for a contact based on contextual similarities to the content of given contact. The contact can include recordings of one or more utterances by respective speakers and attributes of the contact. The attributes of the contact includes identifiers of speakers and a time that the contact has taken place.

A call data generator receives the call data and generates a transcript in a text form of content of the contact. The contact data includes data associated with currently ongoing calls. The call data categorizes the contact based on a predefined set of topics and degrees of relevance of the call to respective topics in a matrix and/or a multi-dimensional vector form. Each dimension corresponding to a topic.

A contact determiner receives a search query for a set of contacts that are similar to a specific contact and/or a speaker of a contact. A contacts determiner determines a degree of similarity between the contact and/or speaker being specified and content of the contacts. The contacts determiner compares similarities of contexts of the respective content of contacts (e.g., using cosine similarity) and generates a list of one or more contacts with similar calls. The contacts transmitter transmits the list.

The term "contact" herein represents a communication (e.g., a call, a phone call, an email, an instant message, and the like) among participants. Accordingly, the contact may include one or more conversations between participants including speakers. For example, a contact may take place between a customer and a call center agent receiving a phone call.

This Summary introduces a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

As discussed in more detail below, the present disclosure relates to determining contacts based on contextual similarity among content of the contacts. In aspects, a contact data generator receives contact data and generates a transcript associated with content of a contact. The contact data may include a recording of the contact, which may be currently in session or previously completed. The contact data generator categorizes the contact into one or more topics based on content of the contact. The topics data may include a pair of a topic and a degree of relevance of the contact to the topic. In aspects, a contact determiner receives a query for searching a contact based on a previous contact as an input. The contact generator generates a list of one or more contacts, each associated with one or more contacts in which content is contextually similar to content of the contacts.

Figure 1:
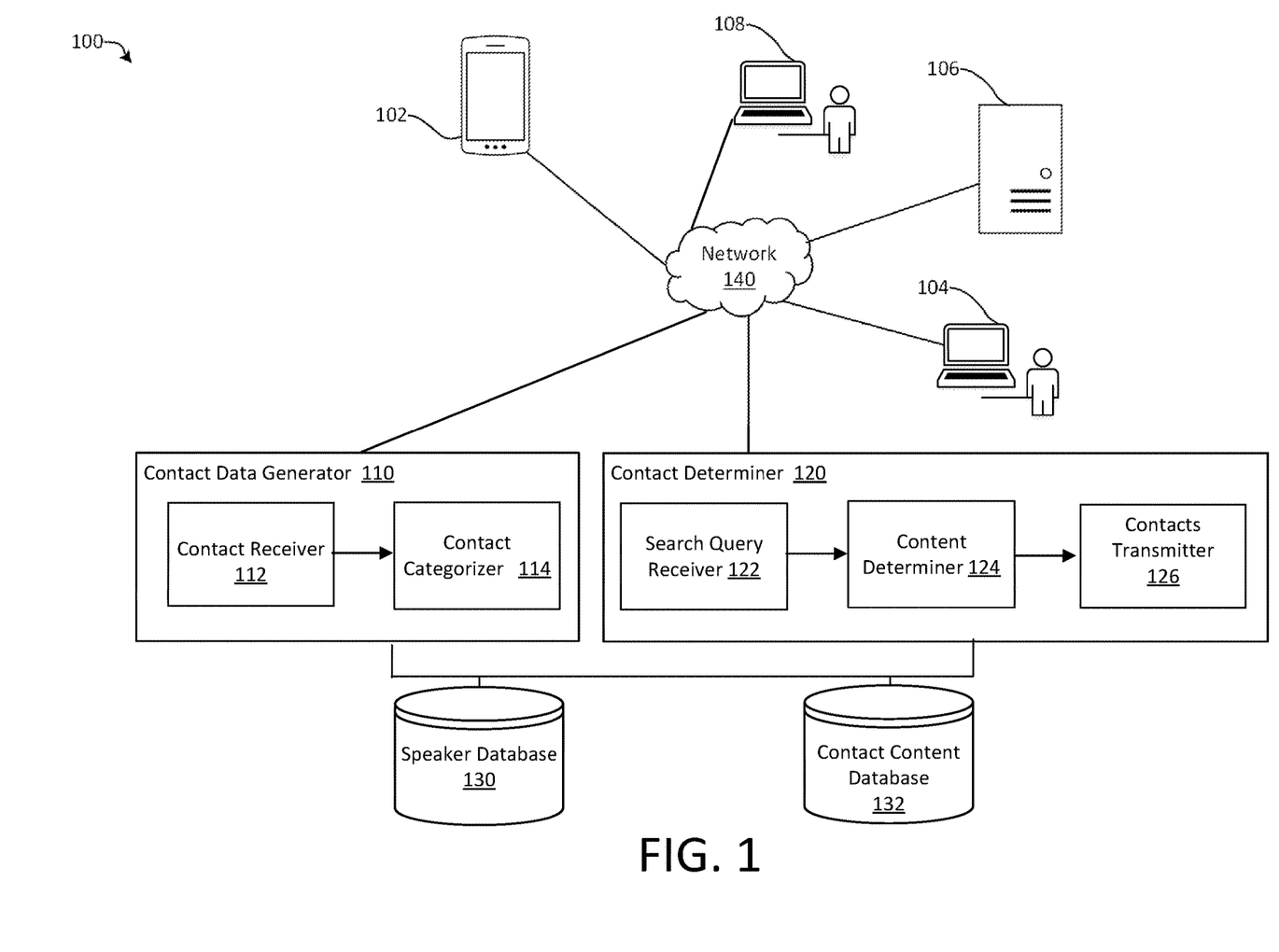
FIG. 1 illustrates an overview of an example system for determining contacts and calls based on context similarity among content of calls in accordance with aspects of the present disclosure.

FIG. 1 illustrates an overview of an exemplary system for determining contacts and contacts based on context similarity among content of contacts in accordance with aspects of the present disclosure. A system 100 may include a client-computing device 102, a computer terminal 104, a virtual assistant server 106, a supervisor device 108, a contact data generator 110, and a contact determiner 120, connected via a network 140. In aspects, the client-computing device 102 may include a smartphone and/or a phone device where a user may participate in a contact or join a conversation with another speaker. The computer terminal 104 may include an operator station where an operator of a contact center may receive incoming contacts from customers (i.e., a user using the client-computing device 102). In alternate aspects, the virtual assistant server 106 may process a virtual assistant for the user using the client-computing device 102 over the network 140. In said scenarios, the user using the client-computing device 102 may join a conversation with a virtual assistant. The network 140 may be a computer communication network. In yet further alternate aspects, the supervisor device 108 may process operations by a supervisor of the operator at the contact center. For example, the supervisor may review recording of contacts received by a particular operator of the contact center. The supervisor may request for and receive contacts that are contextually similar to a contact in question by an operator at the contact center. Additionally or alternatively, the network 140 may include a public or private telecommunication network exchange to interconnect with ordinary phones (e.g., the phone devices).

The contact data generator 110 generates contact data and stores speakers associated with the contact data in a speaker database 130 and contact content associated with the contact in a call content database 132. In aspects, the term "contact data" may include content and attributes associated with a contact. For example, the contact data includes a recording (e.g., audio) of content of a contact, a transcript in text form of content of the contact, audio characteristics (e.g., tone, pitch, and the like) of content of the contact, attributes of the contact, text of the contact (e.g., an email or instant message conversation), and the like. The attributes of the contact may include, for example, one or more speaker identifiers identifying the particular call, the department or organization receiving the contact, etc., an identifier of a contact center operator who received the call, and a contact duration. Furthermore, the contact data may include one or more pairs of a topic category and a degree of relevance of content of the contact to with the topic category. In aspects, the topic category may be predefined across a plurality of contacts or within a particular contact. For example, if a contact identifies a particular operator assigned to a particular department, e.g., the topic category may be determined to be related to the operator's department, e.g., tech support, subscriptions, and the like.

The contact data generator 110 includes a contact receiver 112 and a contact categorizer 114. The contact receiver receives call data associated with a contact. In aspects, the contact data may include a transcript of the utterances made during the contact. The contact receiver 112 may obtain the contact data from one or more of the client-computing device 102, the computer terminal 104, and/or the virtual assistant server 106 over the network 140. Additionally or alternatively, the contact receiver 112 may receive the contact data from the network 140 as the network 140 transport the contact data during the contact among speakers of the contact. The contact receiver 112 may store the contact data in the contact content database 132.

The contact categorizer 114 categorizes a contact by associating the contact with one or more topic categories. In aspects, a topic category may be paired with a value representing a degree of relevance between the contact and the topic categories. For example, topic categories associated with a contact may include but not limited to "Escalations," "Warranty," "Complaints," "Billing," "Payment," "Website," "Repair," and the like. A value that represents a degree of relevance may be expressed in various forms. For example, the value may include but not limited to numerical values expressed as a percentage (i.e., 0-100). In some other aspects, the value may be between 0.0 and 1.0. In aspects, the contact categorizer 114 stores speakers associated with the received contact data in the speaker database 130. The contact categorizer 114 may store content of the contact including audio characteristics and the transcript and a set of the pairs of topic categories in the contact content database 132.

The contact determiner 120 may determine contacts in response to receiving a search query. In particular, the contact determines contacts and/or contacts associated with one or more speakers based on contextual similarity between a contact as specified in the search query and content of contacts in the contact content database 132. In aspects, the contact determiner 120 includes a search query receiver 122, a content determiner 124, and a contacts transmitter 126.

The search query receiver 122 receives a query associated with searching for one or more contacts that are contextually similar to a given contact or a call as an input of the query. In aspects, a search query includes search parameters. The search parameters may include a speaker identifier (e.g., an ID or a name associated with a speaker of a received contact) and/or a contact identifier (e.g., an ID or a name associated with a received contact). In aspects, the search query asks for one or more speaker identifiers of speakers associated with contacts that are substantially similar to contacts associated with the speaker or the speaker as specified in the input. In some aspects, the search parameters may specify values or a range of values associated with attributes (i.e., metadata) of contacts. The attributes of contacts may include but not limited to a start time, an end time, a time duration of a contact, a hold time during the contact, and the like.

The content determiner 124 determines contextual similarity between content of contacts associated with the speaker received as input in the search query and content of contacts stored in the contact content database 132. In aspects, the contact content database 132 includes degree of relevance between of content of a contact and categories of topics associated with the content. For example, a degree of relevance may be expressed in a numerical percentage value. The degree of relevance may be determined by various methods including but not limited to statistically analyzing content of a contact. Additionally or alternatively, the degree of relevance may be determined by predicting relevance of utterances in the contact to a topic using a machine-learning model (e.g., a neural network, a Transformer model, and the like). Yet in some other aspects, the degree of relevance may be determined by predicting relevance of a sentence in an utterance to the topic using a machine learning model, and predicting relevance of respective words in the sentence to the topic using a machine learning model, and the like. The degree of relevance of content of a contact to a context may further determined based on speakers by assigning degrees of relevance to the context to respective speakers. Distinct speakers may utter speeches that are in distinct contexts during a contact. In some other aspects, a user using a user interface may specify the degree of relevance.

In aspects, the content determiner 124 retrieves contact data as specified by the search query. The content determiner 124 further determines one or more contacts in which likelihood values of context categories (i.e., values of relevance between content of the contact and respective contextual topic of the contact) are similar to the context categories associated with the contact data as specified in the search query.

In aspects, the disclosed technology uses textual comparators based on multi-dimensional vector operations. For example, cosine similarity may indicate a degree of similarity between context of a contact and other contact using multi-dimensional vectors or matrices associated with respective contact. The multi-dimensional vector describes degrees of relevance of content of a contact to respective context categories. A dimension corresponds to a degree of relevance in a context category.

In aspects, the multi-dimensional vectors have common dimensions for across contacts in a corpus of contacts. The fixed dimension enables a comparison among vectors by an angular separation. Contacts that are similar to a high degree in context indicate topic vectors with values that are within a predetermined range in respective dimensions. The angular separation between the contacts may be close to one. Conversely, when two substantially dissimilar calls include distinct likelihood values (i.e., distinct relevance values) for context categories, the angular separation determined using cosine similarity would be large (e.g., the cosine similarity being close to zero). In aspects, the disclosed technology may use a matrix operation for generating angular distances and then sort the generated angular distances to determine the top N nearest neighbors as N contextual similar calls.

The contacts transmitter 126 transmitter one or more contacts associated with the retrieved contacts. In some other aspects, the contacts transmitter 126 may transmit the one or more contacts and a set of links and/or a short snippet of texts in the transcript or a short snippet of contact data.

In aspects, the contacts transmitter 126 of contact determiner 120 may transmit information of one or more contacts associated with contacts that are contextually similar to a contact as specified by the search query as output. The contact determiner 120 may transmit the output to one or more of the client-computing device 102, the computer terminal 104, the supervisor device 108, and/or the virtual assistant server 106 through the network 140.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
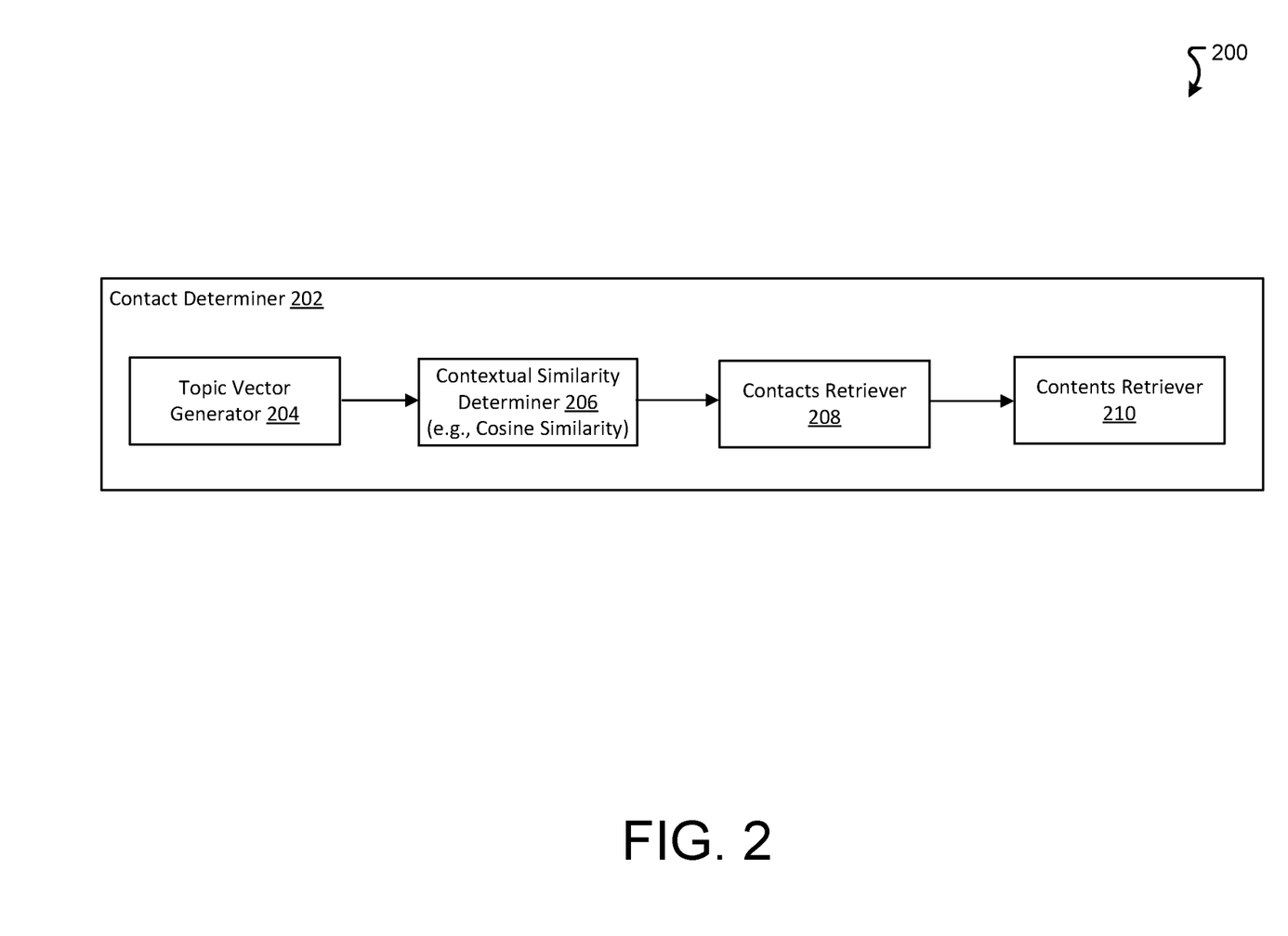
FIG. 2 illustrates an exemplary system for determining contacts and calls based on contextual similarity in accordance with aspects of the present disclosure.

FIG. 2 illustrates an exemplary system for determining contacts based on contextual similarity in accordance with aspects of the present disclosure. The system 200 includes a content determiner 202 (e.g., the content determiner 124 as shown in FIG. 1). In aspects, the content determiner 202 may include a topic vector generator 204, a contextual similarity determiner 206, a contacts retriever 208, and a contents retriever 210. In aspects, the content determiner 202 retrieves contact data as specified by the search query. The content determiner 202 further retrieves contact data that are candidates as an answer to the search query.

The topic vector generator 204 generates a topic vector based on topic categories and corresponding likelihood values associated with a contact (e.g., values representing relevance between the contact and topic categories) as specified by a search query. In aspects, a topic vector is a multi-dimensional vector, where dimensions correspond to respective topic categories and likelihood values. In some aspects, the topic vector generator 204 retrieves the topic categories and values that represent degrees of relevance of the contact to the respective topic categories from a contact content database (e.g., the contact content database 132 as shown in FIG. 1). In aspects, a contact data generator (e.g., the call data generator 110 as shown in FIG. 1) may determine the degree of relevance before storing the contact content in the contact content database (e.g., the call content database 132 as shown in FIG. 1). The contact data generator may determine degrees of relevance between a contact and a content topic by using various methods including through a statistical analysis of a transcript of the contact, through predicting the degree of relevance to a topic by use of a machine-learning model, based on user input, and the like. The topic vector generator 204 further generates topic vectors for contacts that are candidates for a response to the search query. For example, the search query may include search parameters that limit a scope of contacts as candidates by specifying dates and times of contacts and one or more contacts associated with contacts. Accordingly, the topic vector generator 204 generates topic vectors for respective contacts as candidates.

The contextual similarity determiner 206 determines contextual similarity between the topic vectors associated with the contact as specified by the search query (i.e., a reference vector) and those associated with the contacts as candidates for the response (i.e., candidate vectors). In aspects, a contextual similarity may be determined based on a determined angular separation between the reference vector and respective candidate vectors. For example, two substantially similar contacts include similar likelihood (i.e., relevance) values for context categories. Accordingly, the angular separation is small (e.g., the cosine similarity being close to one).

In aspects, the disclosed technology may use a matrix operation for generating angular distances and then sort the generated angular distances to determine the top N nearest neighbors as N contextual similar contacts. For example, two substantially dissimilar contacts include distinct likelihood values for context categories. Accordingly, the angular separation is large (e.g., the cosine similarity being close to zero). In aspects, the disclosed technology may use a matrix operation for generating angular distances and then sort the generated angular distances to determine the top N nearest neighbors as N contextual similar contacts. As such, the contextual similarity determiner 206 outputs a set of contacts that are contextually similar to the contact as specified by the search query.

The contacts retriever 208 retrieves contacts associated with respective contacts in the set of contacts that are contextually similar to the contact as specified by the search query. In aspects, the contacts retriever 208 retrieves from the contacts database (e.g., the speaker database 130 as shown in FIG. 1) contacts associated with the respective contacts as determined by the contextual similarity determiner 206.

The contents retriever 210 retrieves content associated with the contact in the set of contacts that are contextually similar to the contact as specified by the search query. In aspects, the contents retriever 210 retrieves the content from the contact content database (e.g., the contact content database 103 as shown in FIG. 1). In some aspects, the contents retriever 210 may generate a short version of the content by extracting one or more portions of the recording of the contacts. The contents retriever 210 may determine particular one or more portion of the recording based on a time duration as specified by the search input. In aspects, the contents retriever 210 may dynamically determine a start point and a time duration of the extracted portion of the recording based on a start time of an utterance made by a speaker and a time at the end of the utterance.

In some other aspects, the contact data may label respective utterances in the contact with one or more topic categories. For example, a second utterance made by a customer during a contact may be marked with a topic category of "Website." The contents retriever 210 may retrieve the second utterance of the contact when the response to the search query needs to include contacts about the topic of "Website,"

As will be appreciated, the various methods, devices, applications, features, etc., described with respect to FIG. 2 are not intended to be limited to use of the system 200, rather the system 200 is provided as an exemplary system that may be used by the aspects disclosed herein. Accordingly, additional data structures or configurations may be used to practice the methods and systems herein and/or features and applications described may be excluded without departing from the methods and systems disclosed herein.

Figure 3:
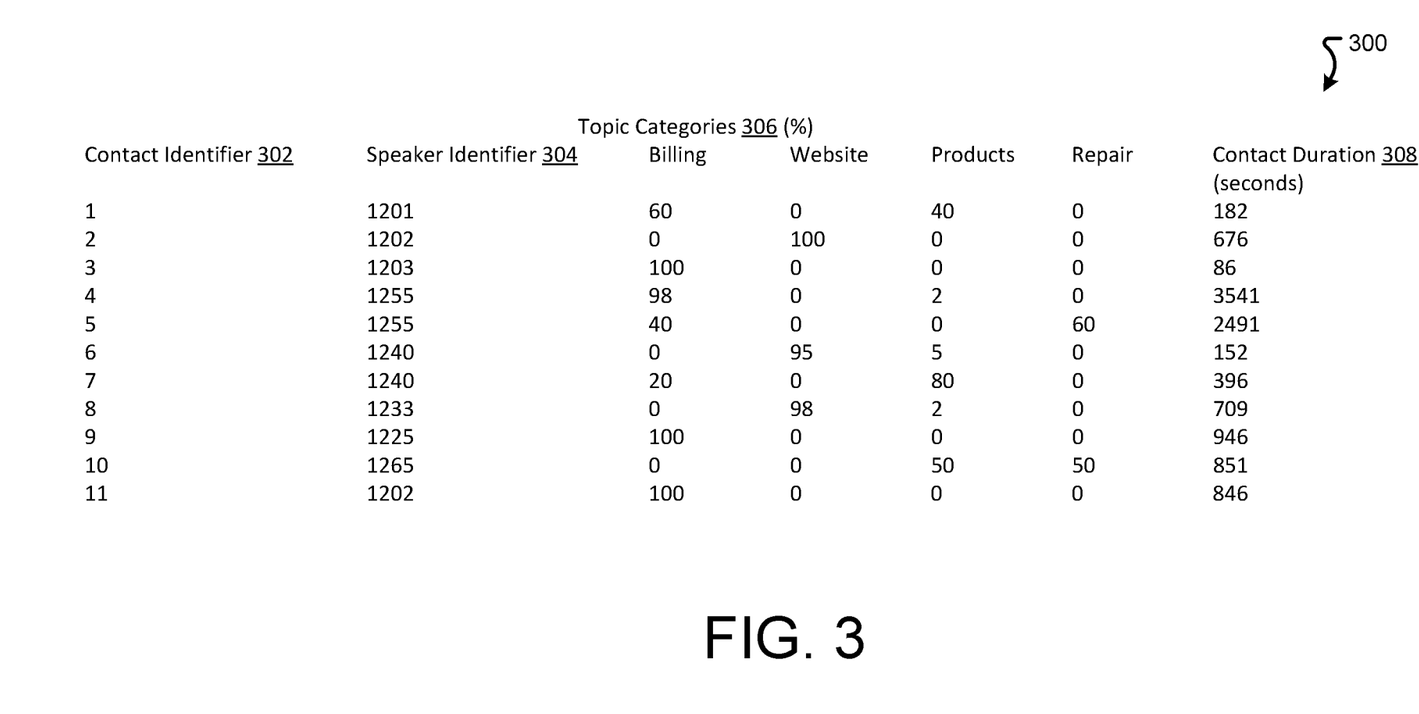
FIG. 3 illustrates an example of contact data with context categories in accordance with aspects of the present disclosure.

FIG. 3 illustrates an example of contact data with context in accordance with aspects of the present disclosure. Data structure 300 includes a contact identifier 302, a speaker identifier 304, topic categories 306, and a contact duration 308. The data structure 300 represents contact data stored in a contact content database (e.g., the call content database 132 in FIG. 1).

In aspects, a row of the data structure 300 represents a contact. The contact identifier 302 identifies the contact. The speaker identifier 304 identifies a speaker associated with the contact. For example, the speaker may represent, an agent, a client or a customer participated in the contact. The topic categories 306 include topic categories and likelihood values (i.e., relevance values that indicate degree of relevance of the contact) associated with the respective topic categories. The likelihood values (e.g., relevance values) may be expressed in a numerical value between zero and one hundred for indicating percentage values. The contact duration 308 indicates a contact duration (e.g., in seconds) of the contact.

For example, a contact with a contact ID 302 of one includes a speaker identifier #1201. Values that represent degrees of relevance of the contact to the topic categories 306 for this contact indicate 60% Billing and 40% Products and zero percent for all other topic categories. The contact duration 308 indicates 182 seconds for this contact. In aspects, a degree of relevance may be determined based on the percentage of the contact directed towards a topic. In some aspects, the degree may reflect a time duration of the contact being directed to the topic. In some aspects, the degree may reflect a contextual depth and/or a range (i.e., a breadth) of subtopics within the topic, and in combination of the depth/breath within the topic conversed during a contact and time duration spent on the topic during the contact.

As shown in FIG. 3, respective contacts vary in likelihood values associated with respective topic categories 306. Another contact with a call ID of 2 is associated with the speaker identifier 304 of 1201 and includes a topic category of Website at 100% likelihood and all other topic categories have zero value, indicating that the contact with the contact ID of 2 includes utterances related to website exclusively.

As will be appreciated, the various methods, devices, applications, features, etc., described with respect to FIG. 3 are not intended to limit use of the data structure 300. Accordingly, additional and/or alternative processes and configurations may be used to practice the methods and systems herein and/or features and applications described may be excluded without departing from the methods and systems disclosed herein.

Figure 4A:
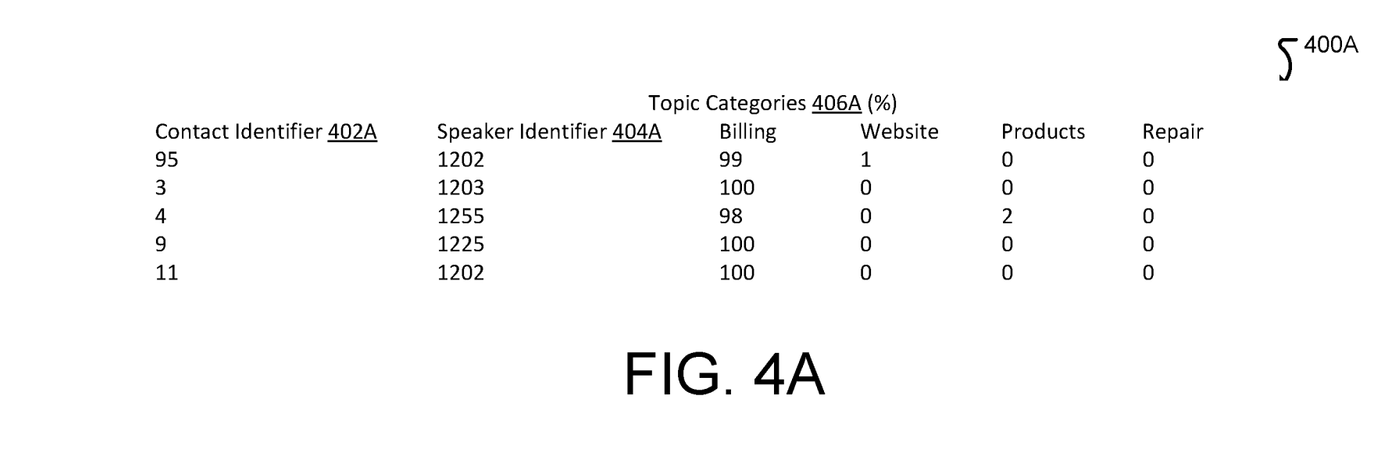
FIGS. 4A-B illustrate examples of data associated with contacts associated with contextual similarities in accordance with aspects of the present disclosure.

FIG. 4A illustrates an example of contact data with context categories in accordance with aspects of the present disclosure. The data 400A includes a contact identifier 402A (i.e., contact ID), a speaker identifier 404A, and topic categories 406A. The data 400A represents contact data as retrieved from a contact content database (e.g., the contact content database 132 in FIG. 1) based on a search query for contacts that are contextually similar to a contact as specified by the search query. Additionally or alternatively, the data 400A may represent contact data retrieved from the contact content database based on another search for a list of contacts where the contacts are part of contacts that are contextually similar to a contact and/or a contact as specified by the search query.

In aspects, the first row in the data 400A represents a contact as specified by the search query. For example, the search query specifies is a contact with a contact ID 95. Based on data as retrieved from the contact content database, the contact ID 95 indicates that it was received from speaker identifier 404A with a value #1202. The contact includes utterances that are about Billing at 99% and about Website at 1%. That is, the search query asks for contacts where almost all of the content associated with the call relates to Billing and a little about Website.

In aspects, the second row and the rest of the contacts represent candidates as a response to the search query. For example, contacts that correspond to contact IDs #3, #9, and #11 indicate 100% likelihood of the topic category being "Billing." The contact ID #4 indicates 98% likelihood in "Billing" and 2% likelihood in "Products." In aspects, the disclosed technology (e.g., the contextual similarity determiner 206 as shown in FIG. 2) uses a cosine similarity to determine whether contacts that are within a predetermined degree of similarity. For example, the topic vector generator may generate a topic vector with a multi-dimensional value [99, 1, 0, 0] for contact ID #95 associated with the search query. The topic vector generator may further generate another topic vector associated with a contact with a contact ID #3 with a multi-dimensional value [100, 0, 0, 0]. The contextual similarity determiner determines that the two topic vectors are similar based on an angular distance between the two vectors.

In aspects, the contacts retriever may generate a list of contacts based on the data 400A as a response to the search query. For example, the list of contact identifiers may be 1202, 1203, 1225, and 1255. In some other aspects, the contents retriever may transmit content (or a link to the content) in response to the search query. For example, the contents retriever (e.g., the contents retriever 210 as shown in FIG. 2) retrieves content (e.g., recordings and/or transcripts) associated with the three contacts (#3, #4, #9, and #11) and transmit the content of the four contact in response to the search query.

Figure 4B:
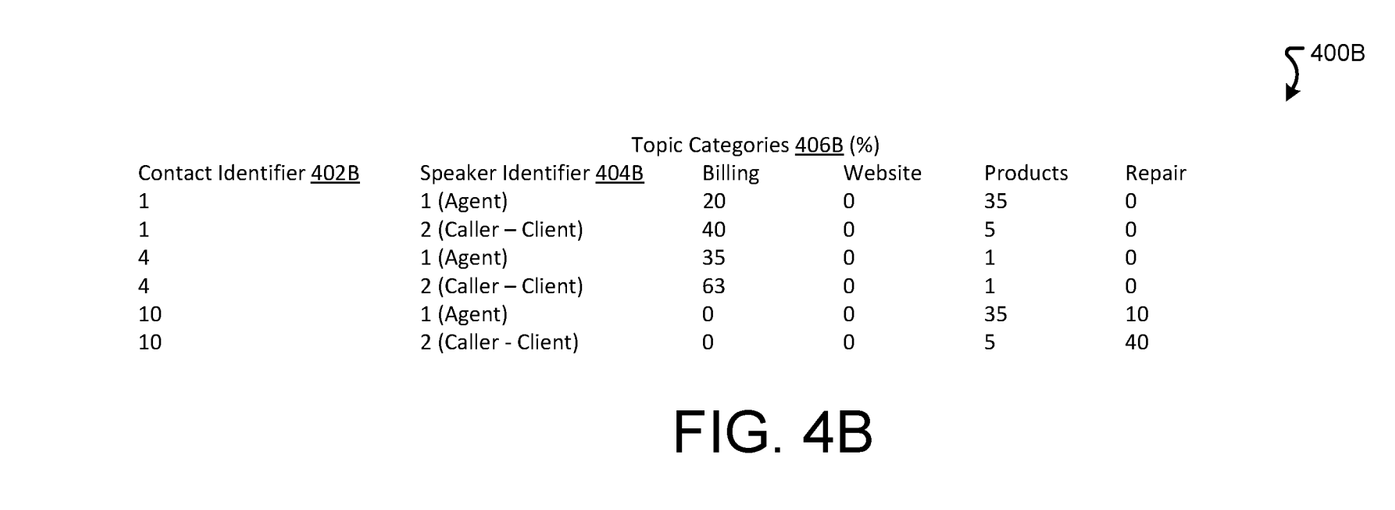

FIG. 4B illustrates an example contact data in accordance with aspects of the present disclosure. The data 400B includes a list with columns including contact identifier 402B, speaker identifier 404B, and topic categories 406B. A row of the table corresponds to topic categories as spoken by a speaker during a contact. For example, in contact #1, a speaker with a speaker identifier #1 (i.e., Agent of a contact center) spoke for 20% of the contact about billing and 35% about products. During the same contact #1, speaker #2 (i.e., speaker—client) spoke 40% about billing and 5% about products. In another example, in contact #4, the agent spoke 35% about billing and 1% about products, while the speaker #2 (i.e., speaker—client) spoke 63% about billing and 1% about products. In yet another example, in contact #10, the agent spoke 35% about products and 10% about repair, while the speaker-client spoke 5% about products and 40% about repair.

In aspects, the present disclosure provides answers to a search query for one or more contacts that are contextually similar based on utterances made by specific speakers. For example, the search query may specify speaker #1 "Agent" as a speaker and contact #1 to find contacts with similar contexts. The disclosed technology may select contact #4. The speaker on the contact #4 has a topic vector (35, 0, 1, 0), which more contextually similar (e.g., smaller in angular separation and larger in cosine similarity) with the topic vector of the search query (20, 0, 35, 0), as compared to a topic vector for the agent (0, 0, 35, 10) in the contact #10.

Figure 5:
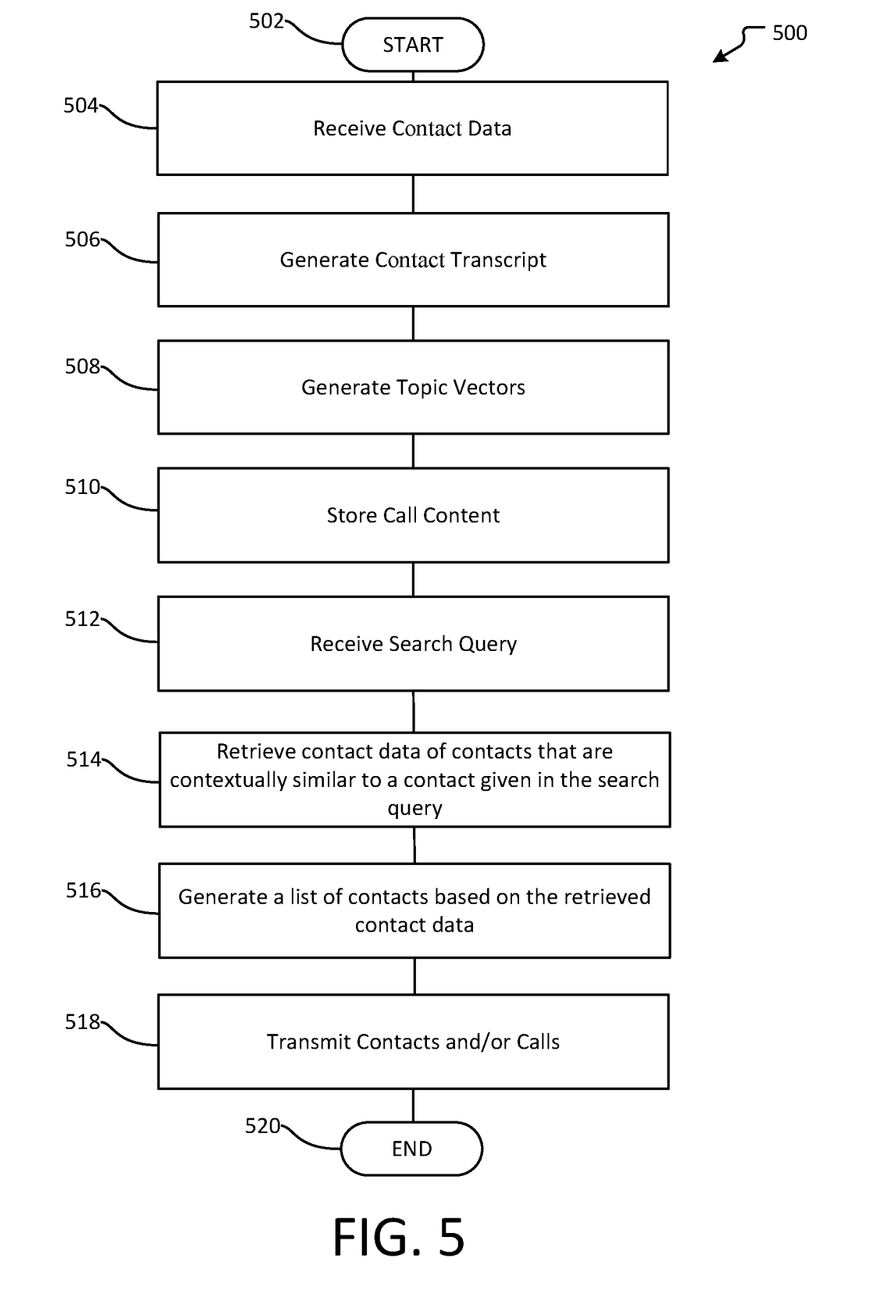
FIG. 5 illustrates an example method for determining contacts in accordance with aspects of the present disclosure.

FIG. 5 illustrates an exemplary method associated with determining contacts and contacts based on contextual similarity according to aspects of the present disclosure. A general order of the operations for the method 500 is shown in FIG. 5. Generally, the method 500 begins with start operation 502 and end with end operation 520. The method 500 may include more or fewer steps or may arrange the order of the steps differently than those shown in FIG. 5. The method 500 can be executed as a set of computer-executable instructions executed by a cloud system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4A-B, 6, and 7.

Following start operation 502, the method 500 begins with receive operation 504, which receives contact data associated with a contact. In aspects, the contact may be a contact that has completed. In some other aspects, the contact may be an ongoing contact. A contact receiver (e.g., the contact receiver 112 as shown in FIG. 1) may receive the contact data from a computer terminal being used by an agent at a contact center or a server at a contact center. In aspects, the contact data may include information associated with speakers of a contact, time, and date of the contact, a duration of the contact, a recording of the contact, and the like.

Generate operation 506 generates a contact transcript in a text form based on the recording of the contact. In aspects, the generate operation 506 may generate separate texts for respective speakers of the contact. In aspects, the generate operation 506 generates topic categories and likelihood of the contact relating to the respective categories. For example, topic categories may include billing inquiries, website, products, and repair, for example. The likelihood may be expressed in a numerical value between zero and one hundred as percentage values.

Generate topic vectors 508 generates topic vectors. In aspects, a topic vector includes a multi-dimensional vector that describes likelihood of a contact relating to particular topic categories. In some aspects, the generate topic vectors 508 may generate a vector associated with a contact. In some other aspects, the generate topic vectors 508 may generate a vector associated with a speaker during the contact.

Store operation 510 may store the contact content in the contact content database (e.g., the contact content database 132 as shown in FIG. 1). In aspects, the contact content includes the contact transcript and one or more topic vectors. In some aspects, a set of topic categories is unique to a contact. Distinct contact may include a distinct set of topic categories. In some other aspects, topic categories may be shared across all contacts.

Receive operation 512 receives a search query. In aspects, a search query may query one or more contacts associated with contacts that are contextually similar to a contact that the search query specifies. In some other aspects, a search query may query one or more contacts (e.g., recordings of contacts) that include content that is contextually similar to a contact that the search query specifies. In some other aspects, a search query may request a response that includes recording and/or text scripts of a contact that is contextually similar to a contact as specified by the search query.

Retrieve operation 514 retrieves contact data associated with contacts that are contextually similar to a contact as specified by the search query. In aspects, the retrieve operation 514 retrieves the contact data from the contact content database by comparing topic vectors associated with candidate contacts. As described above, the disclosed technology may determine cosine similarity (i.e., an angular distance) between the respective topic vectors in the stored contacts and a topic vector associated with the search query.

Generate 516 operation generates a list of contacts that are associated with the retrieved contact data. In aspects, the contacts may represent with respective speakers on contacts. The determine operation 516 determines and/or identifies contacts associated with contacts that are contextually similar in content to a contact as specified by the search query.

Transmit operation 518 transmits one or more contacts as a result of the search. In aspects, the transmit operation 518 may transmit contact data associated with the resulting one or more contacts. The contact data may include at least a part of recording of the contact and its contact transcript. The transmit operation 518 may transmit the contact data to a computer terminal used by an agent at the contact center and/or the client device used by a speaker of the contact. The method 500 ends with end operation 520.

As should be appreciated, operations 502-520 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
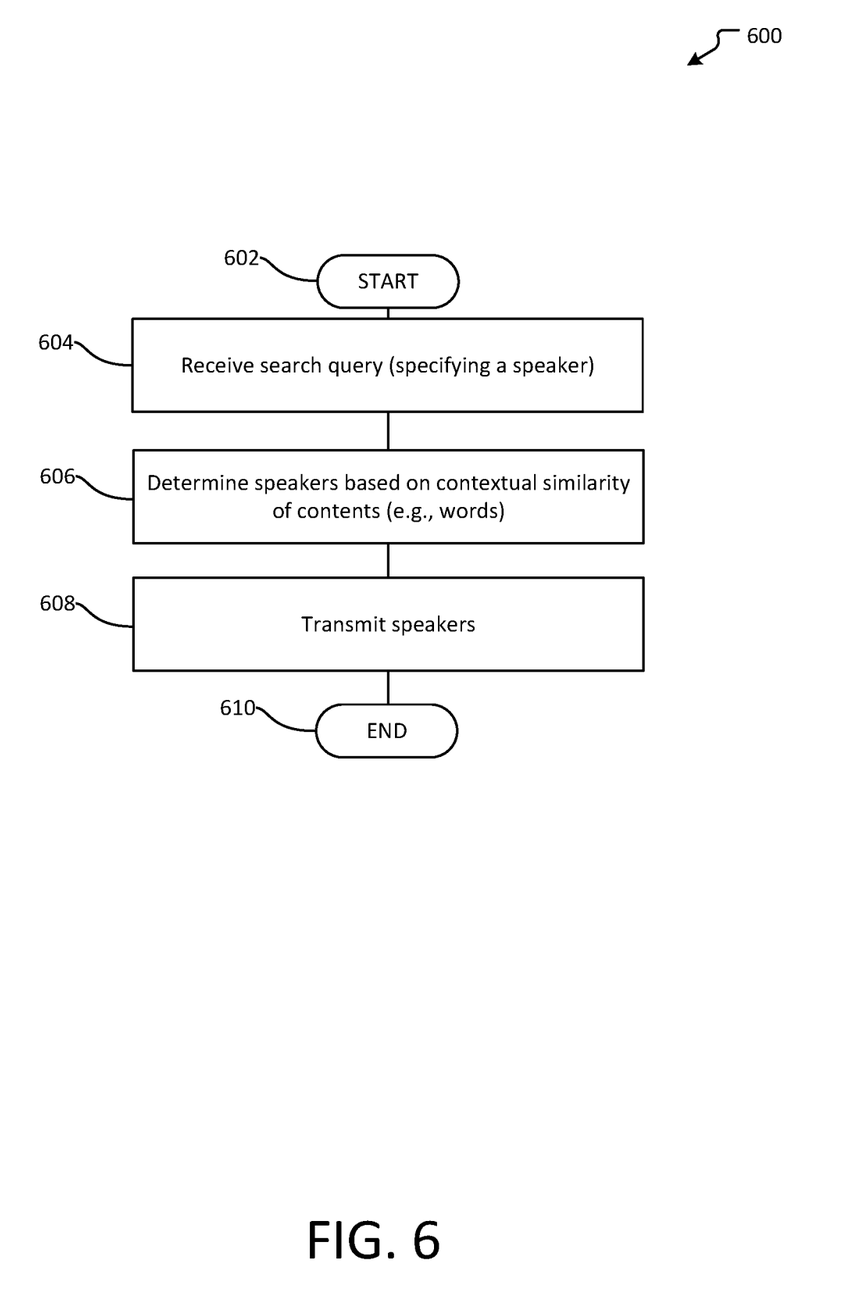
FIG. 6 illustrates an example method for determining contacts in accordance with aspects of the present disclosure.

FIG. 6 illustrates an exemplary method associated with determining contacts and contact based on contextual similarity according to aspects of the present disclosure. A general order of the operations for the method 600 is shown in FIG. 6. Generally, the method 600 begins with start operation 602 and end with end operation 610. The method 600 may include more or fewer steps or may arrange the order of the steps differently than those shown in FIG. 6. The method 600 can be executed as a set of computer-executable instructions executed by a cloud system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3, 4A-B, 5, and 7.

Following start operation 602, the method 600 begins with receive operation 604, which receives a search query. In aspects, the search query may specify a speaker and queries for other speakers and contacts associated with the other speakers, where a context of contacts associated with the other speakers is similar to contacts made by the speaker as specified by the search query.

Determine operation 606 determines one or more speakers based on contextual similarity of contents of contacts. In aspects, the contact content database may include topic vectors associated with respective speakers of a contact. The determine operation 606 may generate a topic vector associated with the speaker as specified by the search query by first retrieving contact data associated with the speaker and generate a topic vector based on topic vectors associated with respective contacts in the retrieved contact data. In some aspects, the topic vector associated with the speaker as specified by the search input is an average and/or an aggregate of the topic vectors associated with the speaker.

The determine operation 606 may compare the topic vector of the speaker with topic vectors associated with respective speakers in contacts. In aspects, the determine operation 606 determines contextual similarities by determining and comparing cosine similarity values (i.e., an angular distance) between the topic vector associated with the speaker and topic vectors of other speakers. The determine operation 606 may determine and/or identifies speakers with topic vectors that are within a predetermined angular distance with the topic vector associated with the speaker as specified by the search query.

Transmit operation 608 transmits a list of one or more speakers. In aspects, the transmit operation 608 may transmit the list of one or more speakers to the computing terminal used by an agent of the contact center. The agent of the contact center may inquire and receive a list of other agents (and/or contacts) who spoke in contacts that are contextually similar in content. The method 600 ends with the end operation 610.

As should be appreciated, operations 602-610 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
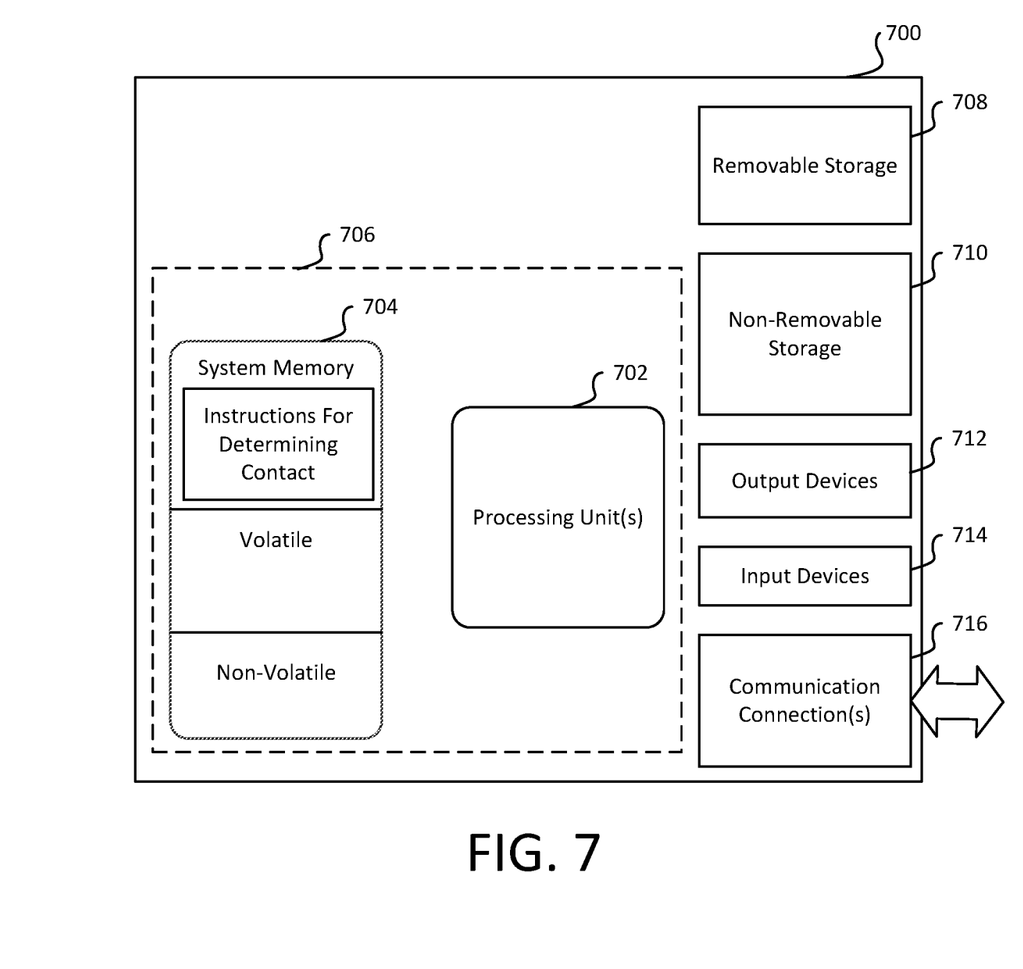
FIG. 7 illustrates a simplified block diagram of a device with which aspects of the present disclosure may be practiced in accordance with aspects of the present disclosure.

FIG. 7 illustrates a simplified block diagram of a device with which aspects of the present disclosure may be practiced in accordance with aspects of the present disclosure. The device may be a mobile computing device, for example. One or more of the present embodiments may be implemented in an operating environment 700. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 700 typically includes at least one processing unit 702 and memory 704. Depending on the exact configuration and type of computing device, memory 704 (instructions to determine a contact as described herein) may be volatile (such as RAM), non-volatile (such as ROM, flash memory, etc.), or some combination of the two. This most basic configuration is illustrated in FIG. 7 by dashed line 706. Further, the operating environment 700 may also include storage devices (removable, 708, and/or non-removable, 710) including, but not limited to, magnetic or optical disks or tape. Similarly, the operating environment 700 may also have input device(s) 714 such as remote controller, keyboard, mouse, pen, voice input, on-board sensors, etc. and/or output device(s) 712 such as a display, speakers, printer, motors, etc. Also included in the environment may be one or more communication connections 716, such as LAN, WAN, a near-field communications network, a cellular broadband network, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for determining a contact according to at least the examples provided in the sections below. A computer-implemented method comprises receiving a search query, wherein the search query specifies a first contact as a condition of a search; generating a first topic vector associated with the first contact, wherein the first topic vector representing a context associated with the first contact; identifying, based on an angular distance of vectors including the first topic vector, a second contact in a contact content database; retrieving, based on the identified second contact, the contact, wherein the contact include a speaker of the contact; and transmitting the contact as a result of the search query. The method further comprises receiving contact data associated with the second contact, the contact data including at least recording of content of the second contact, a transcript of the second contact, one or more identifiers associated with speakers of the second contact, and a value indicating degree of relevance between content of the second contact and a topic category; generating, based on the value indicating degree of relevance, a second topic vector; and storing the contact data and the second topic vector in the contact content database. The the second contact includes a second topic vector, and wherein the method further comprises determining, based on a cosine similarity between the first topic vector and the second topic vector, the second contact as contextually similar to the first contact. The second contact includes a second topic vector, wherein a combination of the second topic vector and the first topic vector forms an angular distance, and wherein the angular distance is within a predetermined angular distance. The first contact and the second contact are distinct. The search query includes an identifier of a first speaker in the first contact, and wherein the method further comprises generating a second topic vector associated with a second speaker of the second contact, wherein the second topic vector represents one or more topic categories based on words spoken by the second speaker in the second contact; and transmitting an identifier that identifies the second speaker as a response to the search query. The search query includes a range of time as a search parameter. The value indicating degree of relevance includes a numerical value representing a percentage of relevance.

Another aspect of the technology relates to a system. The system comprises a processor; and a memory storing computer-executable instructions that when executed by the processor cause the system to receive a search query, wherein the search query specifies a first contact as a condition of a search; generate a first topic vector associated with the first contact, wherein the first topic vector representing a first context associated with the first contact; identify, based on an angular distance of vectors including the first topic vector, a second contact in a contact content database, wherein the second contact includes a second topic vector representing a second context associated with the second contact; retrieve, based on the identified second contact, the contact, wherein the contact include a speaker of the contact; and transmit the contact as a result of the search query. Execution of the computer-executable instructions further causing the system to receive contact data associated with the second contact, the contact data including at least: recording of content of the second contact, a transcript of the second contact, one or more identifiers associated with speakers of the second contact, and a value indicating degree of relevance between content of the second contact and a topic category; generate, based on the value indicating degree of relevance, the second topic vector; and store the contact data and the second topic vector in the contact content database. Execution of the computer-executable instructions further causing the system to determine, based on a cosine similarity between the first topic vector and the second topic vector, the second contact as contextually similar to the first contact. A combination of the first topic vector and the second topic vector forms an angular distance, and wherein the angular distance is within a predetermined angular distance. A combination of the second topic vector and the first topic vector form an angular distance, and wherein the angular distance is within a predetermined angular distance. The first contact and the second contact are distinct. The search query includes an identifier of a first speaker in the first contact, and execution of the computer-executable instructions further causing the system to generate the second topic vector associated with a second speaker of the second contact, wherein the second topic vector represents one or more topic categories based on words spoken by the second speaker in the second contact; and transmit an identifier that identifies the second speaker as a response to the search query. The search query includes a range of time duration of a contact as a condition of search. The value indicating relevance includes a numerical value representing a percentage of relevance.

In still further aspects, the technology relates to a computer-implemented method. The method comprises receiving a search query, wherein the search query specifies a first contact as a condition of a search; retrieving contact data associated with the first contact from a contact content database; generating, based on the contact data, a first topic vector associated with the first contact, wherein the first topic vector representing a context associated with the first contact; identifying, based on an angular distance between the first topic vector and a second topic vector, a second contact as contextually similar to the first contact, wherein the second contact includes the second topic vector; retrieving at least part of recording associated with the identified second contact; and transmitting the at least part of recording as a result of the search query. The contact data include at least recording of content of the first contact, audio characteristics of content of the contact, a value indicating degree of relevance between content of the first contact and a topic category, and the first topic vector based on the value indicating degree of relevance between content of the first contact and the topic category. The method further comprises identifying the second topic vector in the contact content database, wherein the second topic vector corresponds to the second contact, and wherein the second topic vector and the first topic vector are within a predetermined angular distance.

Any of the one or more above aspects in combination with any other of the one or more aspect. Any of the one or more aspects as described herein.

What is claimed is:

1. A computer-implemented method for determining a contact associated with a context, the method comprising:
receiving a search query, wherein the search query specifies a first contact as a condition of a search;
generating a first topic vector associated with the first contact, wherein the first topic vector representing a context associated with the first contact, wherein the first topic vector is a multi-dimensional vector comprising dimensions that correspond to topic categories and likelihood values, wherein a likelihood value represents a relevance to a topic, and wherein the relevance is determined using a machine-learning model;
identifying, based on an angular distance of vectors including the first topic vector, a second contact in a contact content database;
retrieving, based on the identified second contact, the contact, wherein the contact includes a speaker of the contact; and
transmitting the contact as a result of the search query.

2. The computer-implemented method according to claim 1, wherein the method further comprises:
receiving contact data associated with the second contact, the contact data including at least:
recording of content of the second contact,
a transcript of the second contact,
one or more identifiers associated with speakers of the second contact, and
a value indicating degree of relevance between content of the second contact and a topic category;
generating, based on the value indicating degree of relevance, a second topic vector; and
storing the contact data and the second topic vector in the contact content database.

3. The computer-implemented method according to claim 1, wherein the second contact includes a second topic vector, and wherein the method further comprises:
determining, based on a cosine similarity between the first topic vector and the second topic vector, the second contact as contextually similar to the first contact.

4. The computer-implemented method according to claim 1, wherein the second contact includes a second topic vector, wherein a combination of the second topic vector and the first topic vector forms an angular distance, and wherein the angular distance is within a predetermined angular distance.

5. The computer-implemented method according to claim 1, wherein the first contact and the second contact are distinct.

6. The computer-implemented method according to claim 1, wherein the search query includes an identifier of a first speaker in the first contact, and wherein the method further comprises:
generating a second topic vector associated with a second speaker of the second contact, wherein the second topic vector represents one or more topic categories based on words spoken by the second speaker in the second contact; and
transmitting an identifier that identifies the second speaker as a response to the search query.

7. The computer-implemented method according to claim 1, wherein the search query includes a range of time as a search parameter.

8. The computer-implemented method according to claim 2, wherein the value indicating degree of relevance includes a numerical value representing a percentage of relevance.

9. A system, comprising:
a processor; and
a memory storing computer-executable instructions that when executed by the processor cause the system to:
receive a search query, wherein the search query specifies a first contact as a condition of a search;
generate a first topic vector associated with the first contact, wherein the first topic vector representing a first context associated with the first contact, wherein the first topic vector is a multi-dimensional vector comprising dimensions that correspond to topic categories and likelihood values, wherein a likelihood value represents a relevance to a topic, and wherein the relevance is determined using a machine-learning model;
identify, based on an angular distance of vectors including the first topic vector, a second contact in a contact content database, wherein the second contact includes a second topic vector representing a second context associated with the second contact;
retrieve, based on the identified second contact, the contact, wherein the contact includes a speaker of the contact; and
transmit the contact as a result of the search query.

10. The system according to claim 9, wherein execution of the computer-executable instructions further causing the system to:
receive contact data associated with the second contact, the contact data including at least:
recording of content of the second contact,
a transcript of the second contact,
one or more identifiers associated with speakers of the second contact, and
a value indicating degree of relevance between content of the second contact and a topic category;
generate, based on the value indicating degree of relevance, the second topic vector; and
store the contact data and the second topic vector in the contact content database.

11. The system according to claim 9, wherein execution of the computer-executable instructions further causing the system to:
determine, based on a cosine similarity between the first topic vector and the second topic vector, the second contact as contextually similar to the first contact.

12. The system according to claim 9, wherein a combination of the first topic vector and the second topic vector forms an angular distance, and wherein the angular distance is within a predetermined angular distance.

13. The system according to claim 9, wherein a combination of the second topic vector and the first topic vector form an angular distance, and wherein the angular distance is within a predetermined angular distance.

14. The system according to claim 9, wherein the first contact and the second contact are distinct.

15. The system according to claim 9, wherein the search query includes an identifier of a first speaker in the first contact, and
execution of the computer-executable instructions further causing the system to:
generate the second topic vector associated with a second speaker of the second contact, wherein the second topic vector represents one or more topic categories based on words spoken by the second speaker in the second contact; and
transmit an identifier that identifies the second speaker as a response to the search query.

16. The system according to claim 9, wherein the search query includes a range of time duration of a contact as a condition of search.

17. The system according to claim 10, wherein the value indicating relevance includes a numerical value representing a percentage of relevance.

18. A computer-implemented method, comprising:
receiving a search query, wherein the search query specifies a first contact as a condition of a search;
retrieving contact data associated with the first contact from a contact content database;
generating, based on the contact data, a first topic vector associated with the first contact, wherein the first topic vector representing a context associated with the first contact, wherein the first topic vector is a multi-dimensional vector comprising dimensions that correspond to topic categories and likelihood values, wherein a likelihood value represents a relevance to a topic, and wherein the relevance is determined using a machine-learning model;
identifying, based on an angular distance between the first topic vector and a second topic vector, a second contact as contextually similar to the first contact, wherein the second contact includes the second topic vector;
retrieving at least part of recording associated with the identified second contact; and
transmitting the at least part of recording as a result of the search query.

19. The computer-implemented method according to claim 18, wherein the contact data include at least:
recording of content of the first contact,
audio characteristics of content of the contact,
a value indicating degree of relevance between content of the first contact and a topic category, and
the first topic vector based on the value indicating degree of relevance between content of the first contact and the topic category.

20. The computer-implemented method according to claim 18, further comprising:
identifying the second topic vector in the contact content database, wherein the second topic vector corresponds to the second contact, and wherein the second topic vector and the first topic vector are within a predetermined angular distance.

* * * * *